US012686206B2

(12) United States Patent
Kodoi

(10) Patent No.: US 12,686,206 B2
(45) Date of Patent: Jul. 21, 2026

(54) INSPECTION APPARATUS AND PRINTING APPARATUS

(71) Applicant: CANON KABUSHIKI KAISHA, Tokyo (JP)

(72) Inventor: Takuma Kodoi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 84 days.

(21) Appl. No.: 18/586,730

(22) Filed: Feb. 26, 2024

(65) Prior Publication Data

US 2024/0308208 A1 Sep. 19, 2024

(30) Foreign Application Priority Data

Mar. 16, 2023 (JP) ................................. 2023-042095

(51) Int. Cl.
*B41J 2/045* (2006.01)

(52) U.S. Cl.
CPC ......... *B41J 2/04563* (2013.01); *B41J 2/0454* (2013.01)

(58) Field of Classification Search
CPC ............................ B41J 2/0454; B41J 2/04563
See application file for complete search history.

(56) References Cited

U.S. PATENT DOCUMENTS 8,308,265 B2 11/2012 Bansyo
8,985,721 B2 3/2015 Tomizawa et al.
2011/0085004 A1 4/2011 Bansyo
2019/0343026 A1* 11/2019 Zhao .................. H05K 7/20781

FOREIGN PATENT DOCUMENTS

CN 107073952 B * 10/2019 .......... B41J 2/04563
CN 107081960 B * 11/2019 .............. B41J 2/155
JP 2011-083928 A 4/2011

OTHER PUBLICATIONS

Komamiya, Machine TranslationofCN-107081960-B,2019 (Year: 2019).*
Valle De La Munoza, Machine TranslationofCN-107073952-B, 2019 (Year: 2019).*

* cited by examiner

*Primary Examiner* — Scott A Richmond
(74) *Attorney, Agent, or Firm* — Venable LLP

(57) ABSTRACT

A printing head includes printing element boards which are in fluid communication with each other through a liquid chamber, includes an inlet port and an outlet port, and is arranged such that the ink circulates inside the liquid chamber, and inside the liquid chamber, the ink circulates in nozzle portions in the printing element boards. An inspection apparatus includes: the printing head; an inlet passage; an outlet passage; an ink circulatory system; an inlet temperature sensor; and an outlet temperature sensor, and estimates a temperature distribution of the printing head from measured values of the inlet temperature sensor and the outlet temperature sensor and calculates calibration values of the temperature sensors of the respective printing element boards.

20 Claims, 5 Drawing Sheets

| | | LIQUID THERMOMETER (INLET SIDE) | Dev0 | Dev1 | Dev2 | Dev3 | Dev4 | Dev5 | Dev6 | Dev7 | Dev8 | Dev9 | Dev10 | Dev11 | Dev12 | Dev13 | Dev14 | Dev15 | Dev16 | LIQUID THERMOMETER (OUTLET SIDE) |
|---|---|---|---|---|---|---|---|---|---|---|---|---|---|---|---|---|---|---|---|---|
| INK TEMPERATURE | 20°C | 21°C | 664 | 665 | 664 | 663 | 666 | 663 | 662 | 663 | 662 | 662 | 662 | 662 | 661 | 660 | 661 | 660 | 659 | 23°C |
| | 42°C | 41°C | 624 | 626 | 624 | 623 | 627 | 627 | 624 | 625 | 623 | 627 | 627 | 629 | 629 | 629 | 628 | 629 | 628 | 39°C |
| POTENTIAL DIFFERENCE (mV) | | - | 40 | 39 | 40 | 40 | 39 | 36 | 38 | 38 | 39 | 35 | 35 | 33 | 32 | 31 | 33 | 31 | 31 | - |
| TEMPERATURE DIFFERENCE (°C) | | 20°C | 20 | 19.75 | 19.5 | 19.25 | 19 | 18.75 | 18.5 | 18.25 | 18 | 17.75 | 17.5 | 17.25 | 17 | 16.75 | 16.5 | 16.25 | 16 | 16°C |
| POTENTIAL DIFFERENCE (mv/°C) | | - | 2 | 1.975 | 2.051 | 2.078 | 2.053 | 1.92 | 2.054 | 2.082 | 2.167 | 1.972 | 2 | 1.913 | 1.8824 | 1.8507 | 2 | 1.9077 | 1.9375 | - |
| GRADIENT RANK | | - | 5 | 4 | 6 | 6 | 6 | 3 | 6 | 7 | 9 | 4 | 5 | 2 | 2 | 1 | 5 | 2 | 3 | - |

| | | LIQUID THERMOMETER (INLET SIDE) | Dev0 | Dev1 | Dev2 | Dev3 | Dev4 | Dev5 | Dev6 | Dev7 | Dev8 | Dev9 | Dev10 | Dev11 | Dev12 | Dev13 | Dev14 | Dev15 | Dev16 | LIQUID THERMOMETER (OUTLET SIDE) |
|---|---|---|---|---|---|---|---|---|---|---|---|---|---|---|---|---|---|---|---|---|
| INK TEMPERATURE | 20°C | 21°C | 664 | 665 | 664 | 663 | 666 | 663 | 662 | 663 | 662 | 662 | 662 | 662 | 661 | 660 | 661 | 660 | 659 | 23°C |
| | 42°C | 41°C | 624 | 626 | 624 | 623 | 627 | 627 | 624 | 625 | 623 | 627 | 627 | 629 | 629 | 629 | 628 | 629 | 628 | 39°C |
| POTENTIAL DIFFERENCE (mV) | | - | 40 | 39 | 40 | 40 | 39 | 36 | 38 | 38 | 39 | 35 | 35 | 33 | 32 | 31 | 33 | 31 | 31 | - |
| TEMPERATURE DIFFERENCE (°C) | | 20°C | 20 | 19.75 | 19.5 | 19.25 | 19 | 18.75 | 18.5 | 18.25 | 18 | 17.75 | 17.5 | 17.25 | 17 | 16.75 | 16.5 | 16.25 | 16 | 16°C |
| POTENTIAL DIFFERENCE (mv/°C) | | - | 2 | 1.975 | 2.051 | 2.078 | 2.053 | 1.92 | 2.054 | 2.082 | 2.167 | 1.972 | 2 | 1.913 | 1.8824 | 1.8507 | 2 | 1.9077 | 1.9375 | - |
| GRADIENT RANK | | - | 5 | 4 | 6 | 6 | 6 | 3 | 6 | 7 | 9 | 4 | 5 | 2 | 2 | 1 | 5 | 2 | 3 | - |

FIG.5

INSPECTION APPARATUS AND PRINTING APPARATUS

BACKGROUND OF THE INVENTION

Field of the Invention

The present disclosure relates to an inspection apparatus for a printing head which ejects droplets from ejection ports to land the droplets on a print medium, a printing apparatus of the printing head, and a method for inspecting the printing head.

Description of the Related Art

In these years, line heads in which printing elements for ejecting a liquid are mounted in conformity to a print medium width have been utilized in liquid ejection apparatuses used for professional applications such as businesses, commerce, and industries. As an example of supply of a liquid to printing element boards of a line head, the liquid can be supplied to all the printing element boards from an end portion of printing elements on one side. In addition, the liquid which has not been ejected is discharged from an outlet port disposed on the opposite end portion. Besides, there is one in which a liquid is supplied from a supply unit located in a center portion toward outlet portions located in both end portions. Although the configuration is not particularly limited, there is also one in which a liquid is supplied to a plurality of printing element boards from a smaller number of liquid supply units than the number of the printing element boards.

Then, the supply and discharge of a liquid is conducted with a configuration in which the liquid is caused to circulate inside a printing head by means of a pump located outside the printing head, a sub tank for generating negative pressure inside the printing head, or the like. In such a line head, each printing element board is equipped with a temperature sensor which can check the temperature of the printing element board itself.

As a method for controlling a temperature inside a printing head, for example, Japanese Patent Laid-Open No. 2011-83928 (hereinafter referred to as document 1) discloses unit for controlling a temperature of ink by unit of a temperature adjustment mechanism located on a circulation path by measuring temperatures of the ink flowing in and the ink flowing out.

However, the above-described invention can control the temperature of ink by increasing the temperature of the ink but cannot control the temperatures of the printing element boards. In addition, although it is surmised that temperature sensors are included in printing element boards in order to measure the temperatures of the printing element boards, there is a possibility that variations occur in output values of the temperature sensors, and there is thus a possibility that the temperatures of the printing element boards cannot be properly detected.

SUMMARY OF THE INVENTION

An inspection apparatus of the present disclosure has: a printing head, the printing head including a plurality of printing element boards, each of the printing element boards including a temperature sensor which outputs a temperature as a voltage value and a plurality of ejection ports through which to eject a liquid, the plurality of printing element boards being in fluid communication with each other through a liquid chamber, the printing head including an inlet port through which to introduce ink into the printing head and an outlet port through which to discharge the ink to an outside, the printing head being arranged such that the ink circulates inside the printing element boards and the liquid chamber; an ink tank; an ink circulatory system which causes the ink to circulate between the printing head and the ink tank; an inlet temperature sensor which measures a temperature of the ink from the ink tank to the inlet port; and an outlet temperature sensor which measures a temperature of the ink discharged from the outlet port, wherein the inspection apparatus estimates a temperature distribution of the printing head from measured values of the inlet temperature sensor and the outlet temperature sensor.

Further features of the present invention will become apparent from the following description of exemplary embodiments with reference to the attached drawings.

BRIEF DESCRIPTION OF THE DRAWINGS

FIG. 5 shows values of a liquid thermometer and output voltage values of a temperature sensor when the temperature of ink is set to 20° C. and 42° C.

DESCRIPTION OF THE EMBODIMENTS

Hereinafter, examples of embodiments of the present disclosure will be described by using the drawings. However, the following description is not intended to limit the scope of the present disclosure. As an example, the present embodiments employ a thermal method which ejects a liquid by generating bubbles by using a heating element, but the present disclosure can be applied to liquid ejection heads which employ a piezoelectric method and various other liquid ejection methods.

The present embodiment is an inspection apparatus for a printing head in the form of circulating a liquid such as ink between an ink tank and the printing head, but the printing head may be in another form, and only has to be one in which a liquid flows from an inlet side to an outlet side in the printing head. In addition, the present embodiment describes the movement of a liquid from an inlet port in an end portion of the printing head to an outlet portion in the opposite end portion, but a form which has an inlet port in a center portion of a printing head and a liquid flows from the inlet port to outlet portions in both end portions may be employed.

In addition, the present embodiment is a so-called line-type head which has a length corresponding to the width of a print medium, but the present disclosure can be applied to a so-called serial-type liquid ejection head which conducts printing on a print medium while conducting scanning. As a serial-type liquid ejection head, for example, there is a configuration equipped with one printing element board for black ink and one printing element board for color ink. In addition, the liquid ejection head is not only this but may be a line head in the form of having several printing element boards arranged in an ejection port array direction such that ejection ports overlap each other and having a short length shorter than the width of a print medium, where the line head is caused to scan on a print medium. In this case, the present disclosure can be applied to a case where a liquid from the same inlet port is supplied to a plurality of printing element boards.

First Embodiment (Printing Head and Mechanism of Circulation)

Figure 1D:
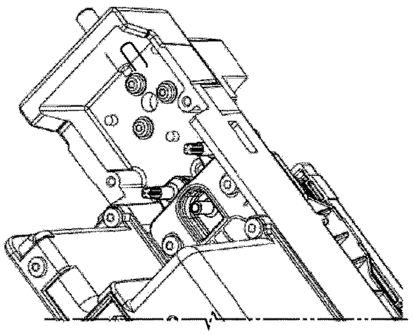
FIG. 1D is an enlarged view of an inlet port of the printing head.
Figure 1C:
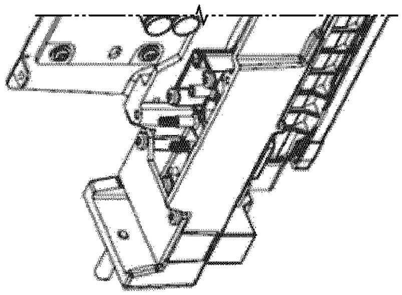
FIG. 1C is an enlarged view of an outlet port of the printing head.
Figure 1A:
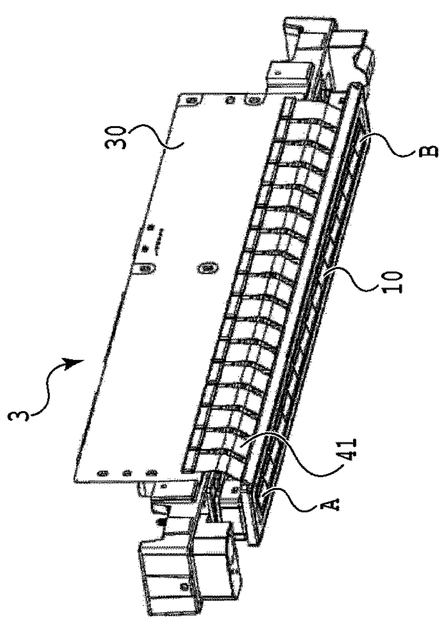
FIG. 1A is a perspective view of a printing head.
Figure 1E:
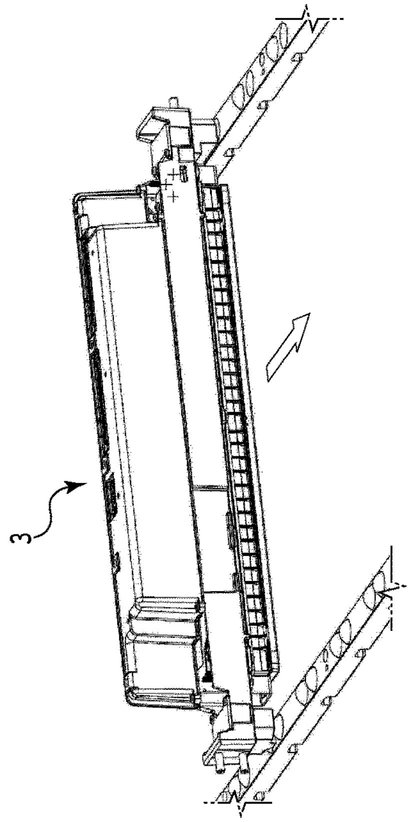
FIG. 1E is a perspective view of the printing head which conducts printing on a print medium.
Figure 1B:
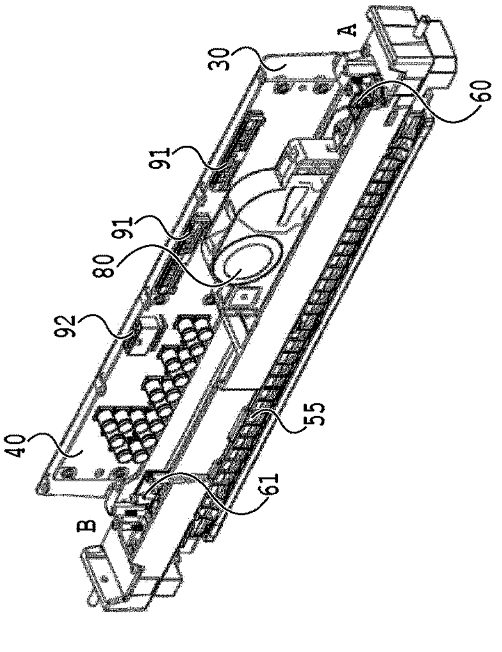
FIG. 1B is a perspective view of the printing head.

A configuration of a printing head 3 according to a first embodiment will be described. FIG. 1A is a perspective view of the printing head 3 according to the present embodiment as viewed obliquely from below, and FIG. 1B is a perspective view of the printing head 3 as viewed obliquely from above. The printing head 3 includes an electric board 40 and is driven by receiving electric signals and power from a main body at a signal input terminal 91 and a power supply terminal 92. The electric board 40 is fastened to a protection member 30 with screws and joined to a casing. The electric board 40 is joined to printing element boards 10 with flexible wiring boards 41. This allows the printing element boards 10 to receive electric signals and power from the main body and drive ejection of ink and the like. The printing head 3 includes a plurality of printing element boards 10 having ink ejection units. In the present embodiment, the printing head 3 includes 17 printing element boards 10, making it possible to conduct printing for the width of a print medium. Hence, in the present embodiment, the printing head 3 does not move, but the print medium moves below the printing head 3 as shown in FIG. 1E, so that a recorded matter is completed. As the print medium, for example, paper, cloth, resin film, and the like can be used. In the present embodiment, each of the printing element boards 10 includes about 8192 ejection ports, from each of which ink of about 2 pl is ejected.

In addition, in the present embodiment, the printing head 3 has a mechanism for causing ink to circulate in the head. FIG. 1C is an enlarged view of a vicinity of an inlet port 60 of the printing head 3, and FIG. 1D is an enlarged view of a vicinity of an outlet port 61 of the printing head 3. Ink having entered from the inlet port 60 on the inlet side flows into a sub tank 80, passes through inside a base plate 55, and is put into each ejection port of the printing element board 10, while ink which has not been used for ejection is eventually discharged from the outlet port 61. The sub tank 80 is partitioned into chambers with high negative pressure and low negative pressure, and ink flows into the base plate 55 with the difference in pressure being maintained. The inside of the base plate 55 has a two-chamber structure (liquid chambers) in which ink flows and is partitioned into a chamber in which ink with high pressure flows and a chamber in which ink with low pressure flows. In addition, the base plate 55 is in contact with the printing element boards 10, and holes which are in fluid-communication with the ink ejection units of the printing element boards 10 are open from both the chamber in which ink with high pressure flows and the chamber in which ink with low pressure flows. This allows ink to circulate inside the printing element board 10. Ink which has been introduced into the printing element boards 10 from the chamber in which ink with high pressure flows and which then has flowed from the printing element boards 10 into the chamber in which ink with low pressure passes through the base plate 55 to the outlet side and is discharged from the outlet port 61. The configuration of the printing head 3 and the configuration of the circulation inside the printing head 3 are as described above.

(Configuration of Inspection Apparatus for Printing Head)

Subsequently, an apparatus for inspecting this printing head 3 will be described. To inspect this printing head 3, it is necessary to input electric signals and power to the electric board 40 from the signal input terminal 91 and the power supply terminal 92. Then, a control board is necessary in order to conduct desired inspection by controlling drive signals and voltage. The inspection mentioned herein is to determine drive voltage, ejection amount, conditions on ejection from nozzles, and the like.

In addition, this inspection apparatus is provided with unit for introducing ink from the inlet port 60 of ink with pressurization and unit for sucking ink from the outlet port 61 with reduced pressure for circulating ink inside the printing head 3.

Figure 2A:
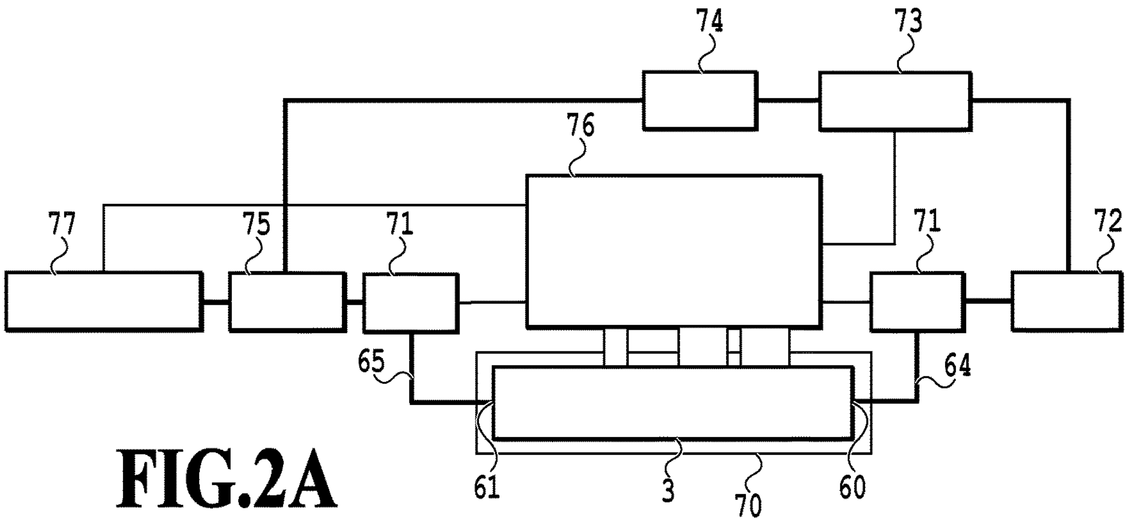
FIG. 2A is a schematic configuration diagram of an inspection apparatus of a first embodiment.
Figure 2B:
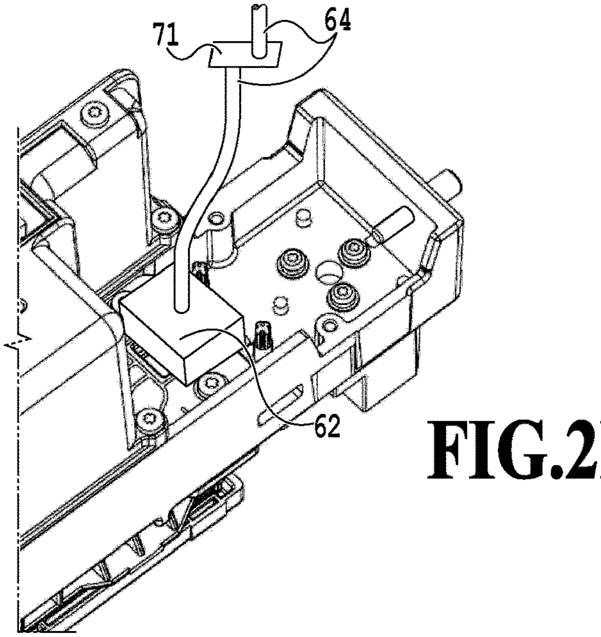
FIG. 2B is an enlarged view of an ink inlet portion of the inspection apparatus.
Figure 2C:
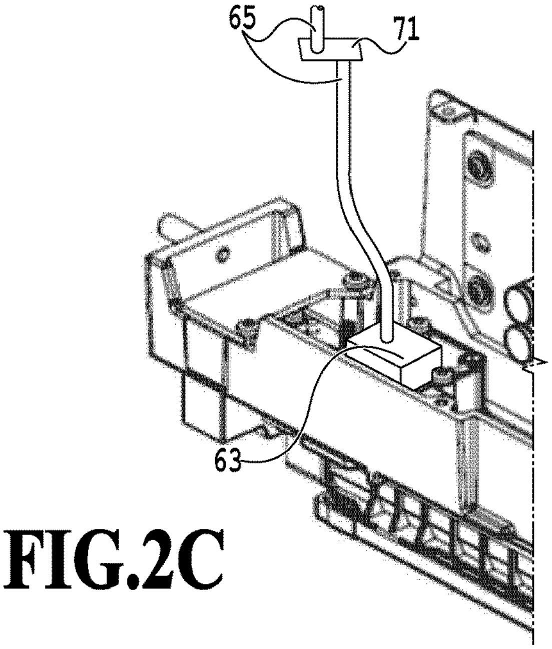
FIG. 2C is an enlarged view of an ink outlet portion of the inspection apparatus.

FIG. 2A is a schematic diagram of an inspection apparatus of the first embodiment. A control board 76 conducts control of electric signals and power for the printing head and also control of a pressure pump and a liquid thermometer. Although only one control board is shown in the drawings of the present embodiment, it is often the case that a plurality of control boards are provided for the respective roles, and the number of control boards is not particularly limited. First, the inlet port 60 and the tube of an inlet passage 64 of the inspection apparatus are connected to an inlet member 62 as shown in FIG. 2B, and the outlet port 61 and the tube of an outlet passage 65 of the inspection apparatus are connected to an outlet member 63 as shown in FIG. 2C. The printing element board side of the printing head is covered and sealed with a cap 70, and the inlet passage 64 and the outlet passage 65 are closed by using solenoid valves or the like. The closing unit may be a solenoid valve or may be a hand-made cock or the like, and is not particularly limited as long as the closing unit can close a passage. After the inlet passage 64 and the outlet passage 65 are closed, the inside of the printing head 3 is brought into a reduced pressure state close to vacuum by conducting suction from the cap side. Opening the inlet passage 64 in this reduced pressure state fills the printing head 3 with ink instantly. Once a certain amount of ink has been put, the cap 70 is opened. After ink has been put in the printing head 3, the outlet passage 65 is also opened, and the supply pressure pump 73 is operated to pressurize ink in the supply tank 72 to press ink from the inlet port 60. Although the supply pressure pump 73 is operated here at this timing, the supply pressure pump 73 may be operated during the filling, and the timing is not particularly limited as long as the filling is possible. By operating the outlet pressure pump 77 as well at the same time to reduce the pressure in the outlet tank 75, the circulation in the printing head 3 can be started.

Subsequently, contents of inspection will be described. The contents of inspection include obtaining conditions such as thresholds regarding ejection such as how much degree of voltage value the ejection is conducted with and how much degree of pulse width the ejection is conducted with. However, in these years, using ink while keeping the ink warm is increasing because an increase in viscosity of ink makes ejection difficult, or in order to suppress a change in ejection amount during ejection. It is also the premise to keep this printing head warm for use. Any unit may be used for keeping warm, like installing a sub heater in the printing element boards 10, providing, outside the printing head, unit for heating ink to be introduced itself up and introducing the ink, or the like. Each printing element board 10 has a temperature sensor to measure the temperature in the case of keeping warm. However, there are many cases where temperature sensors each composed of a diode and the like have various properties in the respective printing element boards. For example, there is a tendency that temperature sensors are different, having individual properties such as voltage values to output at the same temperature and gradients of increases in voltage due to changes in temperature. In addition, since power supply for an amplifier circuit attached to the electric board 40 is received from the control board 76, there is a possibility that an accurate voltage is not inputted due to influence of another signal line and the like. In this amplifier circuit, an offset value varies if the power supply is shifted even by 0.1 V, a value to be outputted largely varies. However, it is difficult to measure the voltage inputted to the circuit every time. In addition, it is also difficult to output the same output voltage at the entrance of a printing head, including an inspection apparatus. In the case where command transfer is conducted so as to increase the temperatures of the printing element boards 10 including ink to 40° C. in such a state, even though the output values of the diodes are in conformity with one another, there is a case where the actual temperatures of the printing element boards 10 are not precisely in conformity with one another. In addition, since the temperature sensors in the printing element boards 10 are configured to be able to obtain values by amplifying voltage values obtained by causing current to flow through the circuit by unit of amplifier circuits or the like on the electric board, a perfect countermeasure is difficult.

In view of this, in the embodiments of the present disclosure, liquid thermometers 71 are inserted near the inlet port 60 of the inlet passage 64 and near the outlet port 61 of the outlet passage 65, respectively. This makes it possible to measure the temperature of ink introduced and the temperature of ink discharged in real time to find the output value of the temperature sensor of each printing element board 10. Since this liquid thermometer 71 uses only the power supply of the main body as the power supply of the thermometer unlike the temperature sensors of the printing element boards 10, the liquid thermometer 71 can precisely measure the temperature of ink with almost no fluctuations of the power supply due to influence of the signal lines. This configuration is particularly important in the case of a printing head in which a plurality of printing element boards 10 are arranged side by side. However, although output values can be found, in the case where data is input in order to obtain temperatures by actually turning on power supply, the temperatures of the printing element boards 10 themselves as well as flowing ink and peripheral members are also increased by heat generation of the circuit inside the printing element boards 10 and the like.

Figure 3:
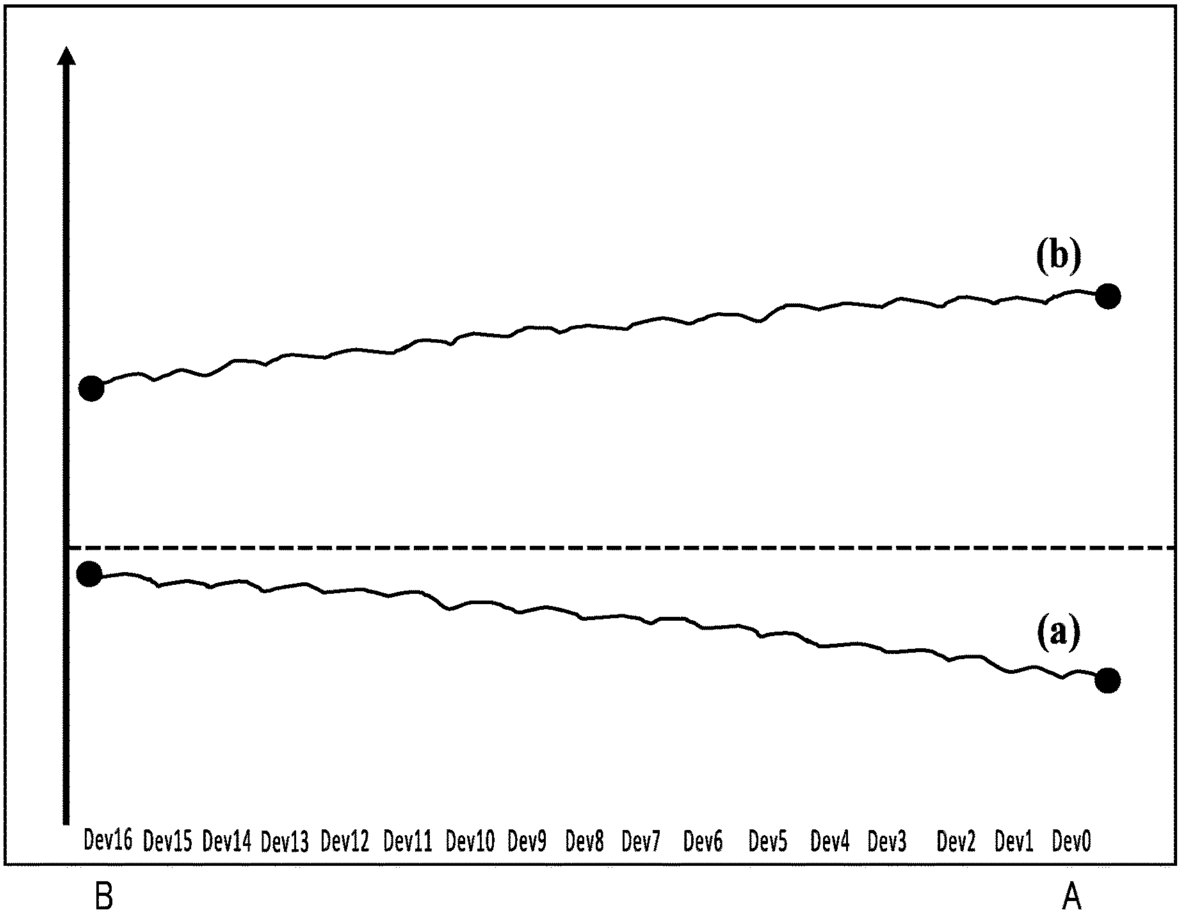
FIG. 3 is a graph representing estimated temperatures of the respective printing element boards.

There is a tendency that in the case where the temperature of ink is lower than room temperature, the temperature on the outlet side increases relative to the temperature on the inlet side. There is a tendency that in the case where the temperature of ink is higher than room temperature or an increase in temperature for energy consumed by the circuit, the temperature is lowered by heat dissipation. FIG. 3 is a graph obtained by estimating temperatures of the respective printing element boards 10 (Dev0 to Dev16) based on values of the liquid thermometers 71 obtained by circulating ink and turning on the power supply of the printing head 3. The inlet side is represented by A while the outlet side is represented by B. Black dots represent values measured by the liquid thermometer 71. It is supposed that the liquid thermometer 71 is at a position where the liquid thermometer 71 is close in distance to the inlet port 60 and the outlet port 61 and does not receive any influence of the external environment. The dotted line represents room temperature. The temperature distribution is, as shown in FIG. 3, such that when room temperature>temperature of ink, the temperature closer to the outlet port 61 (B) becomes higher (see (a) of FIG. 3), while when room temperature<temperature of ink, the temperature closer to the outlet port 61(B) becomes lower (see (b) of FIG. 3). In the case where the temperature is higher than room temperature, although there is an influence of power consumption of the power supply turned on, this tendency of difference in temperature does not change.

Second Embodiment

Figure 4:
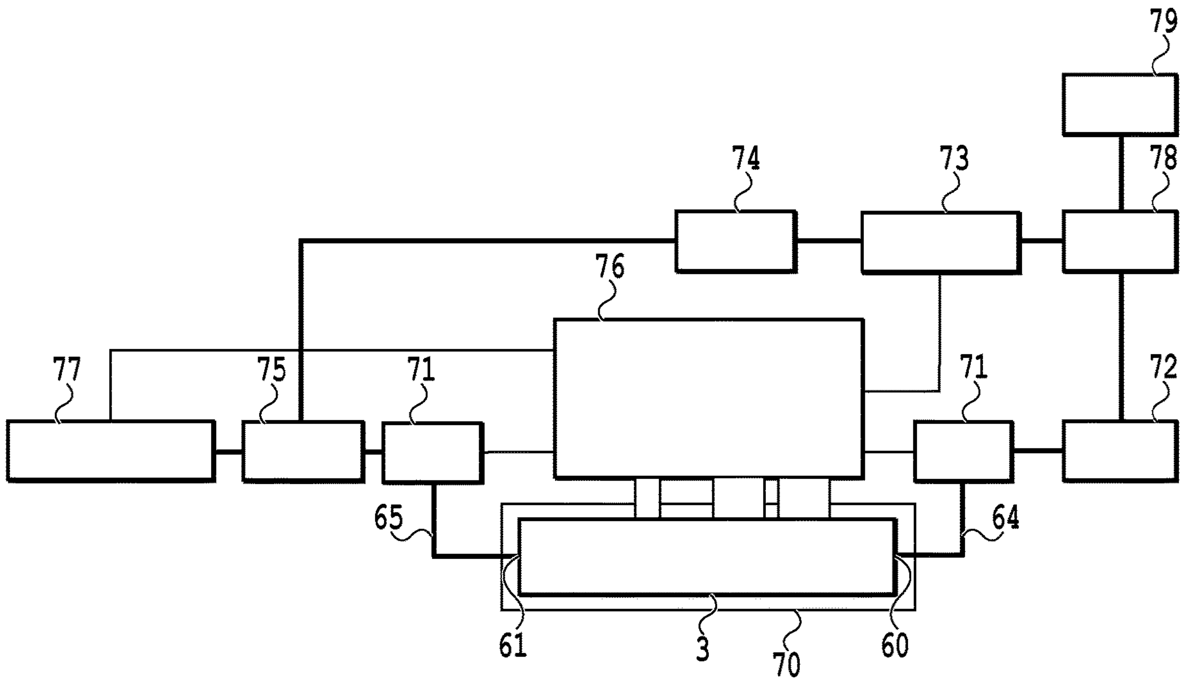
FIG. 4 is a schematic diagram of an inspection apparatus of a second embodiment.

Although the basic configuration is the same as the first embodiment, in the second embodiment, an ink temperature adjustment mechanism is provided in the inspection apparatus, so that the temperature of ink to be introduced can be changed before ink passes from the ink tank 74 through the supply pressure pump 73 into the printing head. In a schematic diagram of FIG. 4, a heat exchanger 78 and a chiller 79 are introduced on the inlet side. The temperature of ink to be introduced is made variable by the chiller. After ink is set to a certain temperature and the value of the temperature sensor of each printing element board is obtained, the set temperature is changed and the value of the temperature sensor is obtained again.

FIG. 5 shows values of the liquid thermometer and output voltage values of the temperature sensor which are taken when the temperature of ink was set to 20° C. and 42° C. It can be seen that when the temperature of ink is set to 21° C., which is lower than room temperature, the temperature of the liquid thermometer tends to slightly increase due to power consumption at the time of measurement and room temperature. When the temperature of ink is set to 42° C., which is higher than room temperature, the temperature gradually decreases due to heat dissipation. In the section of difference in temperature, a temperature estimated in each printing element board is stated, and a gradient of the temperature sensor (how many mV is changed by 1° C.) can be obtained from the difference in output value of the temperature sensor. Regarding the gradient of the temperature sensor thus obtained, the rank of each temperature sensor is written in a storage device such as a volatile memory by referring to a rank table (Table 1) of gradients that the inspection apparatus has. This makes it possible to evaluate how to control the temperature sensor of each printing element board 10 such that the temperature is adjusted to a desired temperature on the inspection apparatus side. In the storage device, information of calibration value thus calculated is stored, and information of the calibration value of each temperature sensor is held. The storage device may be provided in the printing head. In addition, information of the calibration value of each temperature sensor may be held in a data holding unit of the inspection apparatus. The control of these temperatures may be made by using a heat resistance incorporated in the printing element board 10, or may be a control such as driving a heater at such a short pulse that does not cause ejection, and its unit is not limited.

TABLE 1

| Temperature Sensor Gradient Rank Table | | |
|---|---|---|
| Voltage Width | | Rank |
| 1.8 | 1.839 | 0 |
| 1.84 | 1.879 | 1 |
| 1.88 | 1.919 | 2 |
| 1.92 | 1.959 | 3 |
| 1.96 | 1.999 | 4 |
| 2 | 2.039 | 5 |
| 2.04 | 2.079 | 6 |
| 2.08 | 2.119 | 7 |
| 2.12 | 2.159 | 8 |
| 2.16 | 2.199 | 9 |
| 2.2 | 2.239 | 10 |
| 2.24 | 2.279 | 11 |

It is possible to determine the voltage value of each temperature sensor at the time of reaching the target temperature by referring to values in the data holding unit or the storage device in which information of the above-mentioned results and the calibration values obtained from the results is written.

Third Embodiment

A third embodiment is a printing apparatus that conducts printing by using a printing head that is capable of conducting the same control in the same configuration as that of the inspection apparatus of the second embodiment. Since it is possible to precisely control the temperature of the printing head in the same manner as the inspection apparatus and to thus conduct the target temperature control corresponding to the rank of each individual temperature sensor, the stability in printing is secured.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-042095, filed Mar. 16, 2023, which is hereby incorporated by reference wherein in its entirety.

What is claimed is:

1. A printing head inspection apparatus, comprising:

a printing head, the printing head including a plurality of printing element boards, each of the printing element boards including a temperature sensor which outputs a temperature as a voltage value and a plurality of ejection ports through which to eject a liquid, the plurality of printing element boards being in fluid communication with each other through a liquid chamber, the printing head including an inlet port through which to introduce ink into the printing head and an outlet port through which to discharge the ink to an outside, the printing head being arranged such that the ink circulates inside the printing element boards and the liquid chamber;

an ink tank;

an ink circulatory system which causes the ink to circulate between the printing head and the ink tank;

an inlet temperature sensor which measures a temperature of the ink introduced through the inlet port; and an outlet temperature sensor which measures a temperature of the ink discharged from the outlet port, wherein the printing head inspection apparatus estimates a temperature distribution of the printing head from measured values of the inlet temperature sensor and the outlet temperature sensor.

2. The printing head inspection apparatus according to claim 1, which obtains calibration values of the temperature sensors of the respective printing element boards from the temperature distribution of the printing head.

3. The printing head inspection apparatus according to claim 2, wherein the printing head includes a storage device which is capable of storing information of the calibration values calculated, and information of the calibration values of the temperature sensors is held in the storage device.

4. The printing head inspection apparatus according to claim 3, wherein information of the calibration values of the temperature sensors is written in accordance with a temperature sensor rank table which the inspection apparatus has.

5. The printing head inspection apparatus according to claim 1, comprising:

in part of the ink circulatory system, a temperature adjustment mechanism which adjusts the temperature of the ink to be supplied.

6. The printing head inspection apparatus according to claim 5, which causes the ink to circulate while the temperature of the ink is changed to two stages by the temperature adjustment mechanism, obtains values of the inlet temperature sensor, the outlet temperature sensor, and the temperature sensors of the printing element boards, calculates absolute values and gradients (mV/° C.) of the temperature sensors of the printing head, and obtains information of calibration values of the temperature sensors.

7. The printing head inspection apparatus according to claim 6, wherein the gradients of the temperature sensors are written in a volatile memory of the printing head in accordance with a temperature sensor gradient rank table which the inspection apparatus has.

8. The printing head inspection apparatus according to claim 1, wherein the printing element boards are arrayed in series, and the ink flows through the printing element boards in sequence.

9. The printing head inspection apparatus according to claim 1, wherein the printing head is a line-type head.

10. A printing apparatus comprising:

a printing head, the printing head including a plurality of printing element boards, each of the printing element boards including a temperature sensor which outputs a temperature as a voltage value and a plurality of ejection ports through which to eject a liquid, the plurality of printing element boards being in fluid communication with each other through a liquid chamber, the printing head including an inlet port through which to introduce ink into the printing head and an outlet port through which to discharge the ink to an outside, the printing head being arranged such that the ink circulates inside the printing element boards and the liquid chamber;

an ink tank;

an ink circulatory system which causes the ink to circulate between the printing head and the ink tank;

an inlet temperature sensor which measures a temperature of the ink introduced through the inlet port; and an outlet temperature sensor which measures a temperature of the ink discharged from the outlet port, wherein the printing apparatus estimates a temperature distribution of the printing head from measured values of the inlet temperature sensor and the outlet temperature sensor.

11. The printing apparatus according to claim 10, which obtains calibration values of the temperature sensors of the respective printing element boards from the temperature distribution of the printing head.

12. The printing apparatus according to claim 11, wherein the printing head includes a storage device which is capable of storing information of the calibration values, and information of the calibration values of the temperature sensors is held in the storage device.

13. The printing apparatus according to claim 12, wherein information of the calibration values of the temperature sensors is written in accordance with a temperature sensor rank table which the printing apparatus has.

14. The printing apparatus according to claim 10, comprising:

in part of the ink circulatory system, a temperature adjustment mechanism which adjusts the temperature of the ink to be supplied.

15. The printing apparatus according to claim 14, which causes the ink to circulate while the temperature of the ink is changed to two stages by the temperature adjustment mechanism, obtains values of the inlet temperature sensor, the outlet temperature sensor, and the temperature sensors of the printing element boards, calculates absolute values and gradients (mV/° C.) of the temperature sensors of the printing head, and obtains information of calibration values of the temperature sensors.

16. The printing apparatus according to claim 15, wherein the gradients of the temperature sensors are written in the storage device of the printing head in accordance with a temperature sensor gradient rank table which the printing apparatus has.

17. The printing apparatus according to claim 16, which determines output voltage values of the temperature sensors at the time of a target temperature by referring to the storage device in which calibration information of the temperature sensors and the gradients of the temperature sensors are written.

18. The printing apparatus according to claim 15, wherein the gradients of the temperature sensors are written in a data holding unit of the printing apparatus in accordance with a temperature sensor gradient rank table which the printing apparatus has.

19. The printing apparatus according to claim 18, which determines output voltage values of the temperature sensors at the time of a target temperature by referring to the data holding unit in which calibration information of the temperature sensors and the gradients of the temperature sensors are written.

20. The printing apparatus according to claim 10, wherein the printing element boards are arrayed in series, and the ink flows through the printing element boards in sequence.

* * * * *